UNITED STATES PATENT OFFICE.

GUSTAV CHRISTIAN FÜRCHTEGOTT HAUSER, OF ERLANGEN, GERMANY, ASSIGNOR TO THE CHEMISCHE FABRIK AUF ACTIEN, VORMALS E. SCHERING, OF BERLIN, GERMANY.

WATERPROOF COMPOSITION.

SPECIFICATION forming part of Letters Patent No. 572,295, dated December 1, 1896.

Application filed June 9, 1894. Serial No. 514,091. (No specimens.) Patented in England September 28, 1893, No. 18,237; in Italy November 18, 1893, No. 34,979, and December 10, 1893, No. 35,207; in France December 22, 1893, No. 233,080; in Austria May 31, 1894, No. 44/2,028, and in Hungary September 24, 1894, No. 1,222.

*To all whom it may concern:*

Be it known that I, GUSTAV CHRISTIAN FÜRCHTEGOTT HAUSER, of Erlangen, Germany, have invented an Improved Waterproof Composition, (for which I have obtained French Letters Patent No. 233,080, dated December 22, 1893, and two additions thereto dated, respectively, February 10, 1894, and November 8, 1894; two Italian Letters Patent No. 34,979, dated November 18, 1893, and No. 35,207, dated December 10, 1893; British Letters Patent No. 18,237, dated September 28, 1893; Austrian Letters Patent No. 44/2,028, dated May 31, 1894, and Hungarian Letters Patent No. 1,222, dated September 24, 1894,) of which the following is a specification.

This invention relates to the manufacture of a waterproof gelatin composition which will effectually withstand a high degree of moisture and heat and which may be employed in the manufacture of photographic dry-plates and for other purposes.

The composition consists of gelatin and formaldehyd combined in such proportion and in such manner that the resulting composition is capable of resisting moisture and heat.

In producing my improved waterproof composition I dissolve formaldehyd ($CH_2O$) in water in the proportion of about 0.2 parts of formaldehyd to one hundred parts of water and then immerse the gelatin in the solution. It may be mentioned that 0.2 parts of formaldehyd are able to render insoluble 1.0 part of gelatin. The gelatin may remain in the solution from one to two hours, while thin foils or films will be permeated sooner. The gelatin may be introduced into the solution in a dry state or after it has been liquefied or the solution of formaldehyd may be added to the dissolved gelatin. In case the gelatin has not been previously formed it is formed after immersion, preferably by spreading the composition over plates of glass or metal the surface of which has been polished. The composition is then immediately dried in the air.

The action of the formaldehyd upon the gelatin in rendering the same waterproof proceeds apparently in two successive steps. During the immersion of the gelatin in the solution of formaldehyd a wet and rather loose composition of gelatin, formaldehyd, and water is formed which is readily decomposed at the ordinary temperature into gelatin and formaldehyd, if treated with water. During the drying of this composition, after it has been removed from the formaldehyd solution, the water is expelled and an anhydrous formaldehyd gelatin is formed, which is insoluble even in warm water. It is therefore necessary that the composition should not be washed or otherwise treated with water after removal from the formaldehyd solution and before drying.

Instead of making use of the formaldehyd itself those materials may be used by the mutual influence of which formaldehyd is generated. I may cite the action of oxydizing substances upon wood-alcohol, (methyl alcohol.) The substances mainly to be considered are ozon, peroxid of hydrogen, solutions of salts of persulfuric acid, (sodium, potassium, &c.,) which on being heated form ozon and thus may oxidize methyl alcohol into formaldehyd. Also peroxid of manganese and sulfuric acid in mixture form ozon, which may be used for the oxidation of methyl alcohol to formaldehyd.

My improved waterproof gelatin composition will not become liquefied when immersed or otherwise treated with warm water, the composition being insoluble to such a degree that the same may be immersed in water of 122° Fahrenheit and dried in a room having a like temperature without any danger of liquefying.

Films made of my new composition are adapted to be used in the arts and for commercial purposes generally where films are subjected to the action of heat and moisture. Of course bodies of any other shape and for many different purposes may be made from this composition.

I claim as my invention—

1. The herein-described waterproof composition which consists of anhydrous formaldehyd gelatin free from photosensitive ingredients, substantially as set forth.

2. The herein-described method of producing a waterproof gelatin composition which consists in subjecting the gelatin free from photosensitive ingredients to the action of a watery solution of formaldehyd, then removing the gelatin composition from the solution and then drying the same, substantially as set forth.

Signed at Fürth, Bavaria, this 23d day of May, 1894.

GUSTAV CHRISTIAN FÜRCHTEGOTT HAUSER.

Witnesses:
FRITZ FISCHER,
FRIEDRICH EDUARD VOIT.